Sept. 21, 1954   H. A. QUIST   2,689,580
PRESSURE RELIEF VALVE
Filed Nov. 28, 1951   2 Sheets-Sheet 1
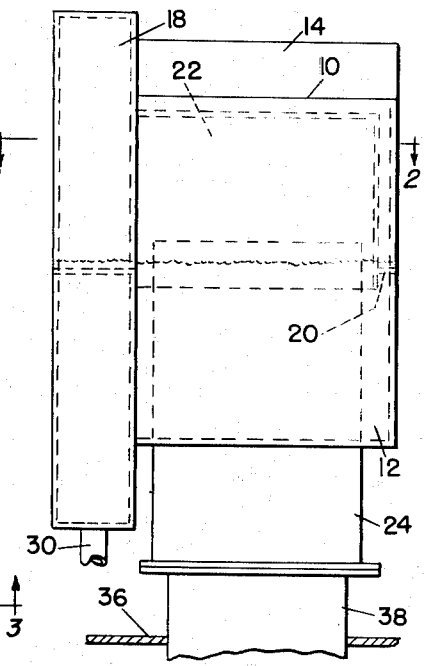
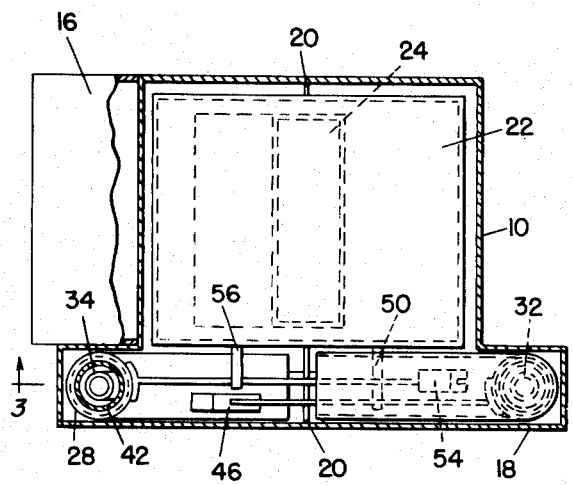
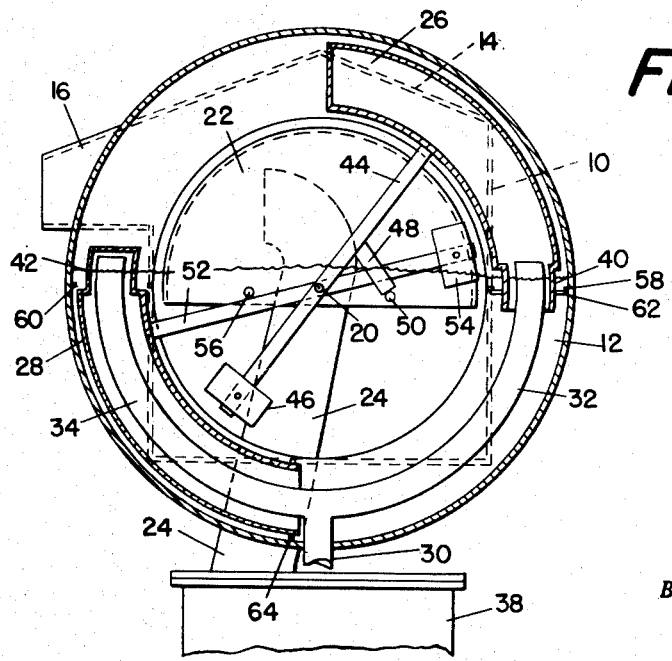
*INVENTOR.*
HAROLD A. QUIST
BY
Busser and Smith
ATTORNEYS

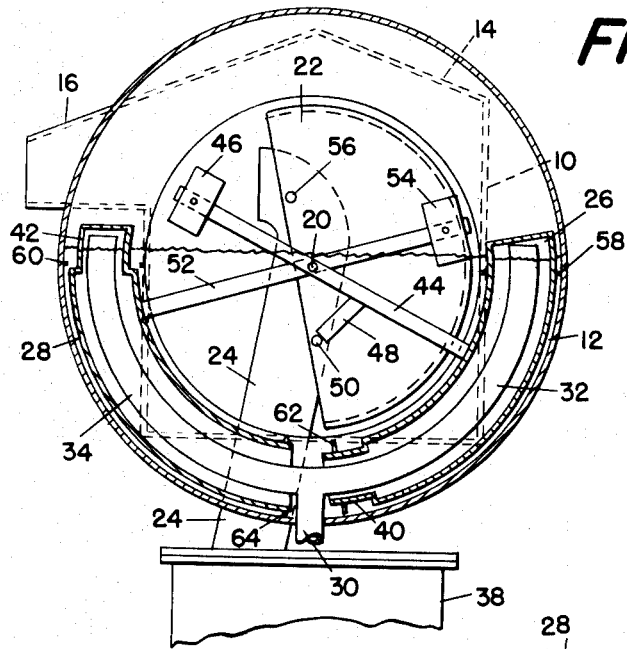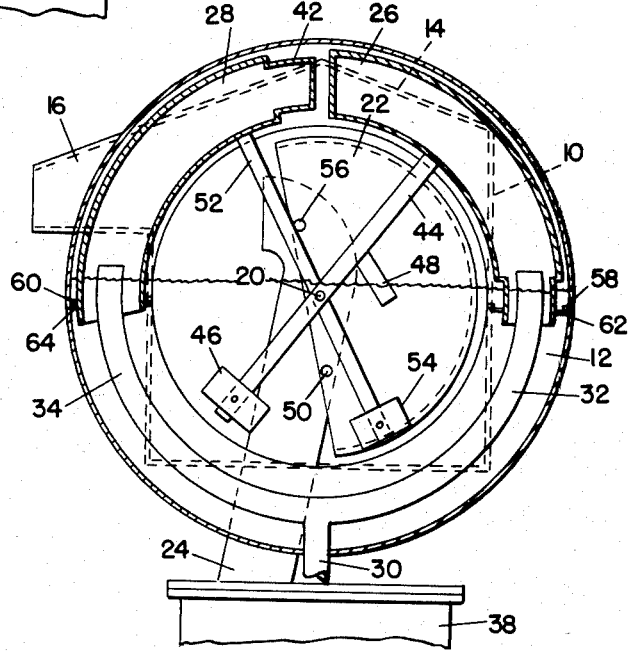

Patented Sept. 21, 1954

2,689,580

UNITED STATES PATENT OFFICE 2,689,580

PRESSURE RELIEF VALVE

Harold A. Quist, Swarthmore, Pa., assignor to Sun Oil Company, Philadelphia, Pa., a corporation of New Jersey Application November 28, 1951, Serial No. 258,621

7 Claims. (Cl. 137—248)

The present invention relates to improvements in vent valves for storage tanks and more particularly to valves for sealing and venting fluid storage tanks under changing conditions of pressure and vacuum.

In the bulk storage of liquids, particularly those of a volatile nature derived in the chemical and petroleum industries, protective measures for safeguarding the storage equipment and conserving the volatile products are primary requirements. Vent valves of various types have been designed for this purpose, of which the most common is the liquid seal type. Among those valves using liquid seals in cooperation with a moving valve member, the pivoted inverted cup valve element is well-known. It is toward this type of valve that the invention here disclosed is directed as an improvement.

Frequent changes of pressure in storage vessels for volatile liquids caused by temperature fluctuations, adding or removing quantities of the stored liquid and other changes well-known to those versed in storage problems, are the chief causes for the fluctuations of pressure which are considered here. Those conditions which increase pressure above atmospheric require that the storage vessels be vented before they are destroyed and at the same time require that the venting be neither premature nor over extended so as to conserve the volatile ingredients of the stored liquid.

On the contrary, a vacuum condition created by a sudden drop in temperatures or the pumping out of liquid may just as easily cause the destruction of the storage facilities by reducing internal tank pressures below atmospheric conditions. This vacuum condition so created must also be relieved with the same degree of prompt action and control as the excessive pressure condition.

The pivoted type of valve using an inverted member capable of sealing contact with a liquid is known and practiced in the art for the control of these conditions. These valves, as they are now designed, are adapted for response to the fluctuating pressure conditions directed into the hollow interior of the inverted cup member. The necessary mechanical advantage to oscillate the valve member is obtained by offsetting the pivotal suspension over the relieving conduit which permits the positive or negative pressures to exert a mechanical force with a leverage determined by the distance of this offset to the calculated point of pressure action. Such a design has a number of obvious disadvantages resulting in uncertain, infrequent, and often chattering operations which do not properly conserve the volatile products. As a result, loss is experienced in the more volatile ingredients of stored liquids which is overcome by the herein disclosed invention. It is the object of this invention to provide an improved valve of this type which is more positive in action and which can be controlled to respond only to predetermined excess pressure and vacuum conditions, otherwise maintaining a sealed relation with the valve structure and preventing any escape of the volatile ingredients.

A further objection to the eccentrically pivoted valves of the type discussed here is the limited opening afforded by the oscillating movement of the valve member. This is a necessary limitation in the known art in order to return the oscillating valve member to the sealed position in contact with the sealing liquid after the venting operation is completed. Due to the fact that the known structures require the valve member to oscillate in one direction to relieve pressure and in the other direction to vent the vacuum conditions, the extent of the oscillation for either relief position is limited. In fact, mechanical means such as weights either permanently fixed or positioned for temporary engagement, are adapted to assist in this return movement to the sealed position. The resulting limited movement of the oscillating valve member restricts the opening through the relief conduit normally covered by this sealing means, which in turn forces the venting gas down into contact with the sealing liquid entraining particles thereof and requiring continual maintainence. It is therefore another object of this invention to provide a relief valve which affords a maximum opening for either pressure or vacuum relief conditions thus permitting the relieving gases to enter or leave the relief conduit with a minimum of contact with the sealing liquid.

It has been indicated above that various mechanical aids have been resorted to for the purpose of assisting pivotally suspended inverted cup type valve members to return to the normal, sealing position. These assisting devices invariably are attached to, or operable with, the valve member and directly affect the operating response thereof. In addition to requiring a force increment to overcome the inertia of these aids, the variable nature of the volatile products and the conditions under which they are generated increases the uncertainty of the valve operation where the effect of such devices must be considered. It is therefore a further object of this invention to provide a pivotal valve member free of any assisting devices which is retained in a balanced sealing position at all times yet positively responsive to pressure and vacuum conditions in the storage vessel and also capable of being controlled within desired operating limits.

In practicing the invention in a preferred form, a housing adapted to contain a sealing liquid at operating level and pivotally suspend an inverted cup type valve member in contact therewith is adapted for mounting on a pressure vessel in communication with the vapor space. A communicating conduit extends upwardly from the vapor space through the valve housing and into the hollow interior of the valve member above the level of the liquid seal. The valve member is positioned to cover the conduit and constructed to be balanced under all variations of pressure in the sealing position, thereby remaining in itself unresponsive to the pressure changes taking place in the vapor space of the storage vessel. The valve member is rotatable, however, as an oscillating member in the operation of relieving excess pressure and excess vacuum as required from time to time. The oscillation of the valve member is acquired by means of responsive actuators in the form of tubular members closed at one end, separately responsive to pressure or vacuum conditions, connected directly to the vapor space of the storage tank, and cooperating with the sealing liquid in the valve housing. Connecting arms attach the tubular members to the oscillatable valve member in such a way that the movement of either tubular member will rotate the valve member in one direction only for the relief of either excessive pressure or excessive vacuum conditions. Control means attached to the lever arm regulating the response of the tubular members within the desired limits of operation make the operation of the valve positive and easily adjustable to fit any particular condition.

For a more complete understanding of the nature and scope of the invention in which the above noted objects and others will be evident, reference is made to the following detailed description read in connection with the accompanying drawing, in which:

Figure 1 is an elevational side view of the device showing the operating parts in dotted line.

Figure 2 is a sectional plan view taken along line 2—2 of Figure 1.

Figure 3 is an elevational view in section of Figure 2 along line 3—3.

Figure 4 is an elevational view in section showing the position of the operating elements relieving a pressure condition.

Figure 5 is an elevational view in section showing the position of the operating elements venting a vacuum condition.

Referring to the figures of the drawing, a description of the elements and their relative positions requires consideration of Figures 1, 2, and 3. In considering the operation of the disclosed device typified by these first three figures, reference will be made additionally to Figures 4 and 5. In all views of the device the parts are numbered alike.

The valve housing 10 is adapted to contain a sealing liquid 12 maintained at a predetermined, operating level. A peaked cover or roof 14 is indicated in Figure 3 and acts as a water shed to prevent accumulation of ice and snow. A vent 16 opens into the upper part of the housing 10 to allow the entrance of air and the outward movement of pressure gases. A cylindrical extension 18 of the housing 10 is positioned on one end thereof and opened thereto to admit the sealing liquid 12 at a level substantially determined by the pivotal axis 20 of the oscillatable valve member 22. A gas relieving conduit 24, rounded on the top to prevent the loss of sealing liquid dropping from the valve member 22, extends upwardly through the valve housing 10 to a point above the liquid level and into the valve member 22 which is in the form of a half cylinder positioned to project into sealing contact with the liquid 12.

The cylindrical extension 18 attached to, and in air and sealing liquid communication with, the valve housing 10 houses a pair of tubular members 26 and 28 each closed at one end, mounted diametrically opposed to each other and centered for operation about the pivotal axis 20. A pressure conduit 30 is branched into separate arcuate divisions, the right branch number 32 and the left branch number 34 looking at the device as shown in Figure 3, and arranged to enter into sealing communication with the tubular members 26 and 28 respectively. The branches 32 and 34 of the pressure conduit 30 communicate with the source of pressure to be relieved in the storage tank 36 through a flanged manhole 38 or other connecting means. Both branches extend through the liquid 12 and are shaped to enter the tubular members above the liquid level and permit sliding engagement therewith. Each of the tubular members 26 and 28 is constricted on the end which normally contacts the level of liquid 12 for purposes of facilitating the initial operation of pressure relief which will be fully explained later. The constrictions noted as numbers 40 and 42 for the tubular members 26 and 28 respectively, form a transverse flange with the remainder of the tubular body which gives a change of effected pressure area for purposes of imparting a rapid response. The tubular member 28 is positioned to normally place the transverse flange below the sealing liquid, while the tubular member 26 normally holds the identical flange above the liquid as shown in Figure 3.

The tubular members 26 and 28 are arranged to oscillate about the pivotal axis 20 of the valve member 22. Tubular member 26 is positioned by the lever arm 44 and held in operative position by the weight 46 fixed to the arm. The closed end is held above the liquid with the constricted end engaging the liquid surface. The arm 44 is pivotally mounted on the pivotal axis 20 of the valve 22. A contacting arm 48 extends from the lever arm 44 to engage a fixed lug 50 projecting from the valve member 22 into operating engagement therewith. The reason for the contacting arm 48 as shown is to position the lever arm 44 in the approximate center of the tubular member 26 and also to maintain contact with the lug 50 beneath the liquid level to prevent freezing or sticking.

The positioning and oscillating transfer means for tubular member 28 is similar to the means described above for piston 26. The closed end of this tubular member is adjacent the constricted end and normally rests just above the liquid level. A lever arm 52 pivotally fixed to the axis 20 positions the tubular member 28 which is held in the nonoperating position by the weight 54 and engagement with the operating lug 56 projecting from the valve member 18. It is to be noted that the engagement between the lever arm 48 and the lug 50 is also beneath the sealing liquid surface for the same reasons stated above.

For consideration of the operation of the valve for relief pressure and venting vacuum, reference is made to the described Figures 1 to 3 inclusive and to the respective Figures 4 or 5 which denote the specific pressure condition being relieved. The position of the elements in Figure 4, as shown, is assumed when the valve is relieving an excess pressure built up in the storage vessel and in Figure 5 for the relief of vacuum conditions.

In Figure 3, the neutral position of the tubular members 26 and 28 are indicated showing the pressure tubular member 28 to be submerged in the liquid below the transverse flange area at the constriction 42 and in sealed relation therewith enclosing the branch 34 of the pressure conduit 30. In like fashion, the vacuum venting tubular member 26 is shown in contact with the sealing liquid, the flange area at the constriction 40 being above the liquid surface and maintaining its sealed relation therewith by normally assuming a position in the upper part of the housing 10, diametrically opposed to the position of tubular member 28.

As will be fully understood after reading the description of the operation of the device, it is necessary to limit the movement of the tubular members 26 and 28. The only contact between the valve member 22 and the respective tubular members is by means of the lever arms 44 and 52 pressing against the lugs 50 and 56 respectively. This operation is a bearing contact only, the valve member 22 not being fixed to either of the lever arms. Consequently the normal position resumed by all moving parts after operation is that shown in Figure 3. To limit the movement of the tubular members for return to this normal position, a flange or spider ring is positioned in each side of the housing extension 18 to enclose each piston. These rings are numbered 58 and 60 and embrace the path of the tubular members 26 and 28 respectively. Lugs 62 on tubular member 26, and similar lugs 64 on tubular member 28 are adapted to engage the respective spider rings at the uppermost limit of travel. In both instances, the rings 58 and 60 are fixed below the sealing liquid surface and like all the other bearing and pivotal contacts of this device are protected against sticking either because of ice or gum.

Returning to a consideration of Figure 3 showing the moving parts of the valve in the neutral or non-venting position, the relief of an excess pressure condition in the storage vessel is transmitted through the relief conduit 24 and the pressure transfer conduit 30 into both tubular members. The vacuum tubular member 26 is maintained in the neutral position with the ring 58 and the lugs 62 resisting further movement. The tubular member 28, however, is free to move about the pivotal axis 20 and oscillate up to engagement of the ring 60 and the lugs 64 to the stop position as shown in Figure 4. The constricted section of the tubular member 28 which forms the transverse flange of increased area is the impetus giving element which permits the tubular member to move sharply into the fully open tubular member. As this flange breaks the surface of the sealing liquid 12 and enters into the pressure receiving volume above the liquid, the effected area against which the excess tank pressure operates is suddenly increased and the desired sharp impetus to movement is given which directly affects the oscillatory movement of the valve member 22. As the piston 28 is moving upwardly, the lever arm 52 assisted by the balancing effect of the lever weight 54 engages the contact stud 56 and moves the oscillatable valve member 22 in a clockwise direction into the open position fully venting the pressure condition through the relief conduit 24 and out the vent 16 of the valve housing 10.

When the excess pressure is fully relieved, the tubular member 28 no longer being supported by the transfer of pressure through the conduit branch 34 returns to the inoperative position, allowing the valve member 22 to return to the balanced position and into sealing engagement with the liquid, and thus preventing further relief of pressure and incident loss of volatile components from the storage vessel 36.

When an excess vacuum condition is created in the storage vessel 36, it is passed through the pressure conduit 30 and its branches 32 and 34 into both tubular members 26 and 28 in a fashion similar to that described for the transmission of excess pressure. The tubular member 28 being in the neutral position cannot respond to the vacuum condition because of the branch 34 and remains stationary while the effect of this minus pressure is to alter the pressure balance in tubular member 26 and cause it to rotate about the pivotal axis 20 under the force of the atmospheric pressure admitted to the tubular chamber and move down into the liquid to assume the position shown in Figure 5.

In the same manner as described above for the impetus to the tubular member in the relief of positive pressures, the atmospheric pressure acting on the sealed top of the tubular member 26 is partly countered by the atmospheric pressure under the flange formed by the constriction of the tubular member 26 at 40 which is above the liquid level in the normal position. On entering the liquid during downward movement, this counter force is suddenly eliminated and a sharp impetus is given to the valve operation.

It is evident by consulting Figure 5 that the valve member 22 is rotated in the same direction (clockwise) for the relief of vacuum as it was in the relief of pressure shown in Figure 4. Thus the openings for venting purposes can be increased to a maximum as the valve member is not required to oscillate in the opposite direction or counterclockwise. In this direction, the tubular member 26 is forced downwardly by the pressure differential between atmospheric pressure and the lower tank pressure, or vacuum condition, transmitted to the tubular member. The connecting lever arm 44 with the extension 48 engaging the operating lug 50 transmits the accentuated movement of the tubular member 26 to the valve member 22 causing it to rotate in a clockwise direction and vent the vacuum condition through the opening 16 in the valve housing and downwardly through conduit 24 to relieve the vacuum condition. It is noteworthy that the engaging lug 56 being above the lever arm 52 is free to rotate away from that element which operates the pressure relief mechanism and therefore only one tubular member and the connecting levers move in response to the specific pressure condition it is designed to relieve.

When the negative excessive pressure, or vacuum, is relieved the effect of the counterbalancing weight 46 is to rotate the tubular member 26 back into the normal position. In manner like the operation described for pressure relief, the oscillating valve member 22 resumes its normal position in sealing contact with the liquid 12 closing the relief conduit 20 and retains the volatile constituents in the storage tank.

While the invention disclosed herein has been described in connection with the details of a preferred structure, it is not intended that these details be regarded as limitations upon the scope of the invention, except insofar as included in the accompanying claims.

I claim:

1. A valve to relieve pressure and vacuum conditions in storage tanks comprising a housing adapted to contain a liquid, a hollow semi-cylindrical valve member pivotally mounted in said housing to oscillate from sealing contact with said liquid, a relief conduit extending through said housing and the liquid to vent into the hollow body of said valve member above the liquid level, a pressure transmitting pipe extending through said housing arcuately branched about the pivotal axis of the valve member to a point above the liquid level, a tubular member closed on one end slidably engaging each branch of the pressure transmitting conduit, positioning arms pivotally supporting the tubular members in operating engagement with the arcuately branched pressure transmitting pipe and the valve member, weights on said arms to counterbalance said tubular members, and engaging means adapted to connect the actuated tubular member with the valve member for selective operation thereof in both pressure and vacuum relief.

2. A valve to relieve pressure and vacuum conditions in storage tanks comprising a housing adapted to contain a liquid, a hollow semi-cylindrical valve member pivotally supported in said housing for oscillatory sealing contact with the liquid, a relief conduit extending through the housing and the liquid to enter the hollow valve member above the liquid level; a pressure transmitting pipe branched in said housing to extend above the liquid on opposite sides of the pivotal support of the valve member; a pressure responsive tubular member closed on one end and pivotally attached to the support of said valve member, balanced to enclose one branch of the pressure transmitting pipe in sealing contact with the liquid and positioned to move upwardly in response to excessive pressure conditions; a vacuum responsive tubular member closed on one end and pivotally attached to the valve member support, balanced to enclose the other branch of said pipe in sealing contact with the liquid and positioned to move downwardly in response to excessive vacuum conditions; means extending from the valve member to engage the moving tubular members whereby said valve member is oscillated in one direction from sealing contact with the liquid to relieve both excessive pressure and vacuum conditions.

3. A valve to relieve pressure and vacuum conditions in storage tanks comprising a housing adapted to contain a liquid, a hollow semi-cylindrical valve member pivotally supported in said housing for oscillatory sealing contact with the liquid, a relief conduit extending through the housing and the liquid to enter the hollow valve member above the liquid level, a pressure transmitting pipe divided into two arcuate branches each extending through the housing to a point above the liquid on each side of the valve member; an arcuate pressure responsive tubular member attached to oscillate about the pivotal support of the valve member in liquid sealed engagement with one branch of said pipe; an arcuate vacuum responsive tubular member attached to oscillate about the pivotal support of the valve member in liquid sealed engagement with the remaining branch of the pressure transmitting pipe; and engaging lugs attached to said valve member projecting to separately engage the tubular members positioning attachments for pressure and vacuum relief movement.

4. A pressure relief valve system comprising a housing adapted to contain a liquid and having a vent to atmosphere; a gas relief conduit adapted for continuous connection to the pressure condition and also for intermittent connection with said vent under conditions of unbalanced pressure as hereinafter specified; a valve in said housing swingable into positions to close and open communication of the gas relief conduit with said vent; two tubular members swingably positioned on the axis of the valve, each closed at one end and the closed ends subject to atmospheric pressure; two conduits adapted for constant communication with the pressure condition and with the interiors of the respective tubular members; said tubular members being weighted, when pressure communicated to their interiors substantially balances the atmospheric pressure against their closed ends, to be swung on their common axis to position their closed ends one relatively near to the conduit with which it communicates and the other relatively far from the conduit with which it communicates; means limiting said swinging movement of each tubular member and in that position holding the valve closed; and mutually engaging means on each tubular member and the valve adapted, when either tubular member is so swung from its weighted position, to turn the valve to its open position and connect the gas relief valve with the atmosphere, thereupon substantially balancing the pressure condition with that of the atmosphere and allowing the actuated tubular member to return to its normal weighted position.

5. The pressure relief valve system defined in claim 4 in which both tubular members are movable away from their normal weighted position in the same circumferential direction.

6. A valve to relieve pressure and vacuum conditions in storage tanks comprising a housing adapted to contain a liquid, a hollow valve member pivotally supported in said housing for oscillatory sealing contact with the liquid, a relief conduit extending through the housing and the liquid to enter the hollow valve member above the liquid level, a pair of closed tubular members operably connected to said valve member and balanced to separately oscillate in response to pressure and vacuum conditions, pipe means extending into said tubular members for the transmission of the pressure conditions thereto, and engaging means connected to each tubular member to operably control and oscillate the valve member in one direction for the relief of either condition.

7. In a device to relieve pressure and vacuum conditions, the combination of a housing adapted to contain a liquid, a relief conduit adapted to communicate with said housing above the level of the liquid therein and adapted at its upper end to communicate with the atmosphere, a turnable hollow valve adapted to occupy an intermediate position in sealing contact with the liquid and close communication of the relief conduit with the atmosphere and to swing in opposite directions to open said communication, arcuately shaped and arcuately movable tubular members each subject to exterior atmospheric pressure and adapted for interior communication with pressure and vacuum conditions to be relieved and, when so communicating, subject to said conditions, weighted levers secured to the respective tubular members and turnable on the axis on which the hollow valve is turnable and each adapted under conditions of substantially balanced pressure to engage the hollow valve and hold it in said intermediate position into sealing contact with the sealing liquid and thus close communication as aforesaid between said conduit and the atmosphere, one of said tubular members under conditions of excess interior pressure being adapted to be swung in one direction by said excess pressure against exterior atmospheric pressure and thereby swing the valve in one direction and the other of which under a vacuum condition being adapted to be swung by exterior atmospheric pressure and thereby swing the valve in the same direction, thereby in either swinging movement opening communication as aforesaid through the relief conduit until balanced pressure conditions are restored.

References Cited in the file of this patent

UNITED STATES PATENTS

| Number | Name | Date |
|---|---|---|
| 1,796,010 | Eakins | Mar. 10, 1931 |
| 1,901,576 | Atwell | Mar. 19, 1933 |

FOREIGN PATENTS

| Number | Country | Date |
|---|---|---|
| 516,228 | Great Britain | 1939 |